United States Patent [19]

Hakamada et al.

[11] Patent Number: 4,777,531
[45] Date of Patent: Oct. 11, 1988

[54] STILL SUB-PICTURE-IN-PICTURE TELEVISION RECEIVER

[75] Inventors: Kunio Hakamada; Satoshi Inashima, both of Tokyo; Kiyoshi Terada, Kanagawa, all of Japan

[73] Assignee: Sony Corporation, Tokyo, Japan

[21] Appl. No.: 450

[22] Filed: Jan. 5, 1987

[30] Foreign Application Priority Data

Jan. 6, 1986 [JP] Japan .................. 61-000464

[51] Int. Cl.$^4$ .................. H04N 5/262; H04N 5/272
[52] U.S. Cl. .................. 358/183; 358/22
[58] Field of Search .................. 358/183, 22, 181

[56] References Cited

U.S. PATENT DOCUMENTS

| | | |
|---|---|---|
| 3,911,420 | 10/1975 | Lampson . |
| 3,943,280 | 3/1976 | Kimura et al. . |
| 4,070,695 | 1/1978 | Scholz et al. . |
| 4,139,860 | 2/1979 | Micic et al. . |
| 4,172,264 | 10/1979 | Taylor et al. . |
| 4,238,773 | 12/1980 | Tsuboka et al. . |
| 4,249,213 | 2/1981 | Imaide et al. . |
| 4,266,242 | 5/1981 | McCoy . |
| 4,267,560 | 5/1981 | Ishikawa et al. . |
| 4,278,993 | 7/1981 | Suzuki . |
| 4,612,569 | 9/1986 | Ichinose . |
| 4,621,259 | 11/1986 | Schepers et al. . |
| 4,623,915 | 11/1986 | Bolger . |
| 4,636,864 | 1/1987 | Annegarn et al. . |
| 4,665,438 | 5/1987 | Miron .................. 358/183 |
| 4,673,983 | 6/1987 | Sarugaku et al. . |
| 4,680,622 | 7/1987 | Barnes et al. . |
| 4,682,234 | 7/1987 | Naimpally . |
| 4,694,343 | 9/1987 | Flora . |
| 4,694,344 | 9/1987 | Flora . |
| 4,698,664 | 10/1987 | Nichols et al. . |
| 4,725,888 | 2/1988 | Hakamada . |
| 4,729,027 | 3/1988 | Hakamada .................. 358/183 |

FOREIGN PATENT DOCUMENTS

| | | | |
|---|---|---|---|
| 2822785 | 12/1978 | Fed. Rep. of Germany ...... 358/183 |
| 34618 | 3/1979 | Japan .................. 358/183 |
| 60-47792 | 10/1980 | Japan . |
| 56-27573 | 3/1981 | Japan . |
| 180283 | 9/1985 | Japan .................. 358/22 |

OTHER PUBLICATIONS

TV Receiver Puts Two Pictures on Screen at Same Time, by Manfred Ullrich and Max Hegendoerfer, Electronics/Sep. 1, 1977.
Fully Digitalized Color Picture in Picture Television System, by Michio Masuda et al. IEEE Transactions on Consumer Electronics, vol. CE-25, Feb. 1979.

Primary Examiner—Tommy P. Chin
Attorney, Agent, or Firm—Philip M. Shaw, Jr.

[57] ABSTRACT

A picture-in-picture type television receiver in which a sub-picture is displayed inset into a main picture. In the television receiver of this invention the viewer, by operating a single control switch, can cause the receiver to display as the sub-picture either a moving picture or a still picture taken from either the main picture or the sub-picture at a selected point in time, at the viewer's option. When the still picture is taken from the main picture, a new still picture is displayed each time the control switch is operated, whereas when the still picture is taken from the sub-picture, the display of the still picture and the display of a real moving picture are alternately carried out each time the control switch is operated.

2 Claims, 3 Drawing Sheets

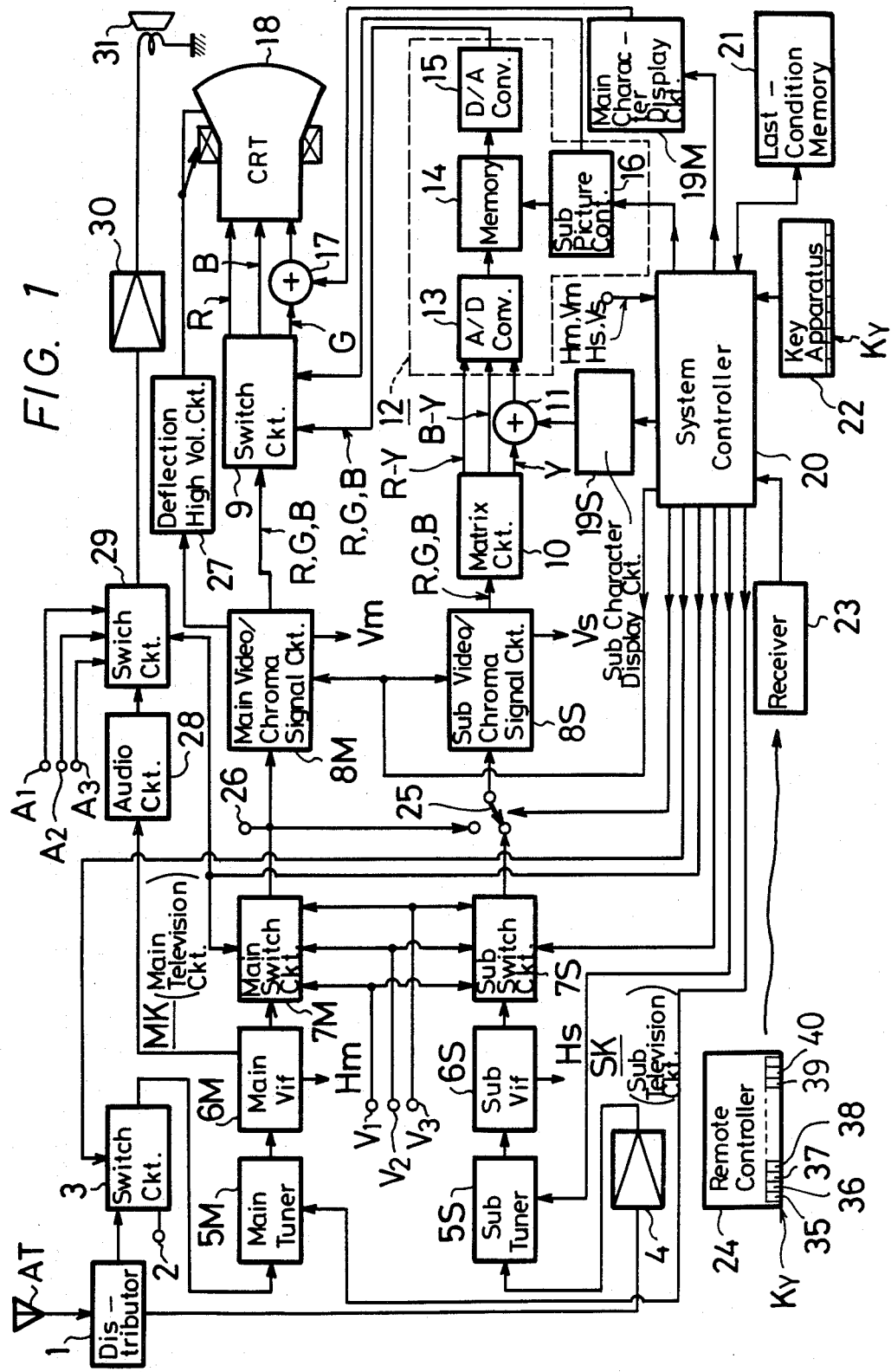

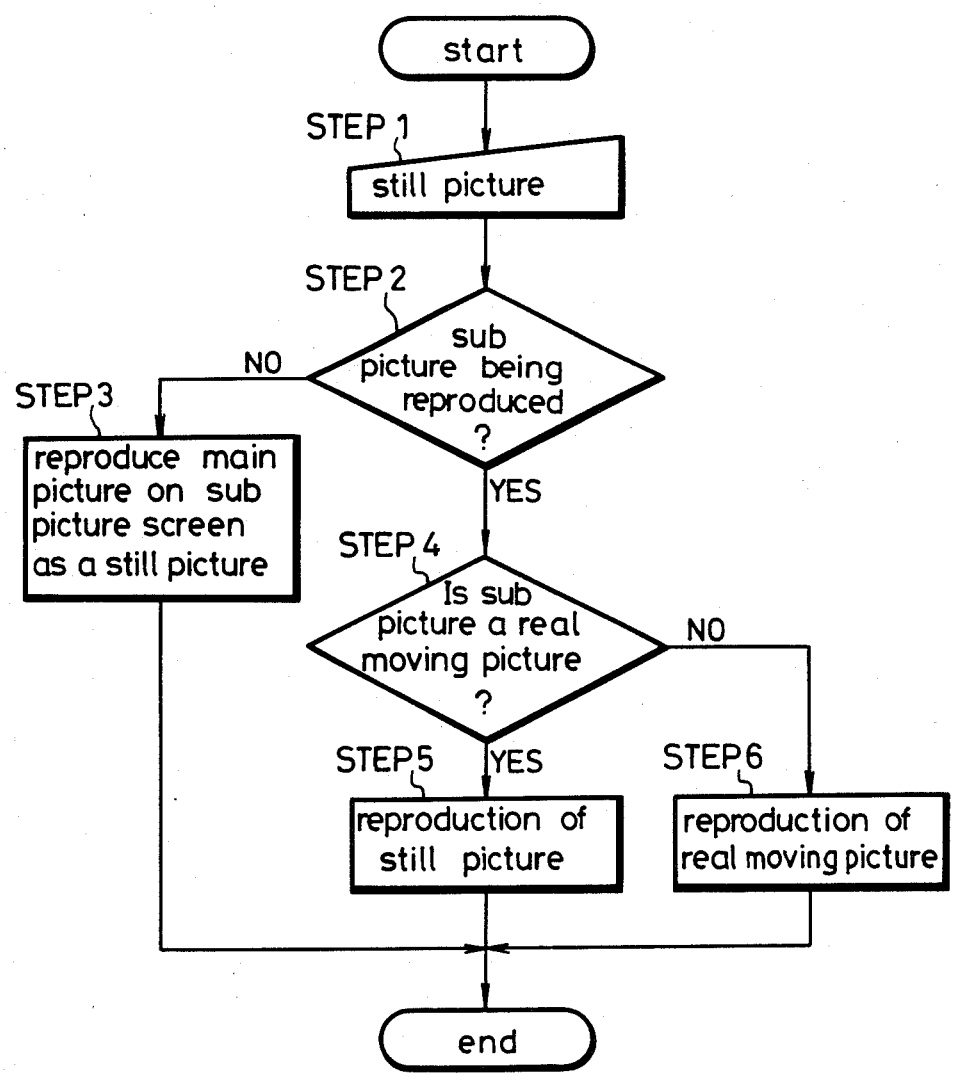

4,777,531

STILL SUB-PICTURE-IN-PICTURE TELEVISION RECEIVER

BACKGROUND OF THE INVENTION

1. Field of the Invention

The present invention relates generally to a socalled picture-in-picture type television receiver in which a sub-picture screen is inset into a main picture screen in a picture-in-picture fashion.

2. Description of the Prior Art

In the prior art, there is known a television receiver of a so-called picture-in-picture type in which a sub-picture is displayed on a sub-picture screen within a main picture screen in an inset fashion.

As will be described later, this picture-in-picture type television receiver includes a memory to reproduce a sub-picture on the sub-picture screen. By controlling the writing in and reading out of the memory, this television receiver is capable of reproducing a picture on the sub-picture screen as a real moving picture or still picture.

This picture-in-picture television receiver also has separate circuits for generating a main picture signal and a sub-picture signal so that the cathode ray tube can independently display on the main and sub-picture screens pictures based on the video signals from different video signal sources. The pictures displayed on the sub-picture screen can be real moving pictures or still pictures which are the same as or different from the picture being displayed on the main picture screen.

The viewer controls what is to be displayed by means of an operation key, however, it is inconvenient, confusing to the viewer, and expensive to provide separate operation keys for each of the separate circuits for generating the main and sub-picture signals.

Further, the television receiver and its remote controller each have only a limited space in which operation keys used for various control operations can be mounted. There is then a problem that it is difficult to increase the number of the operation keys.

OBJECTS AND SUMMARY OF THE INVENTION

Accordingly, it is an object of this invention to provide an improved television receiver of a so-called picture-in-picture type in which a sub-picture is displayed on a sub-picture screen within a main picture screen in an inset fashion.

It is another object of this invention to provide a television receiver of a so-called picture-in-picture type in which a main picture and a sub-picture can be displayed as still pictures by using a single control means.

According to one aspect of the present invention, there is provided a television receiver in which a sub-picture screen is displayed within a main picture screen in an inset fashion comprising: common operation control means for selectively reproducing a main picture or a sub-picture as a still picture on said sub-picture screen, wherein when said main picture is displayed as a still picture, a new still picture is displayed each time said common operation control means is operated, while when said sub-picture is displayed as a still picture, the reproduction of a still picture and the reproduction of a real moving picture are alternately carried out each time said common operation control means is operated.

According to the television receiver of the present invention, it is therefore possible to positively and conveniently reproduce the main picture and the sub-picture as still pictures by using the single operation control means.

These and other objects, features and advantages of the present invention will become apparent from the following detailed description of the preferred embodiment taken in conjunction with the accompanying drawings, throughout which like reference numerals designate like elements and parts.

BRIEF DESCRIPTION OF THE DRAWINGS

FIG. 1 is a block diagram showing an overall arrangement of an embodiment of a television receiver according to the present invention;

FIG. 2 is a flow chart to which reference is made in explaining the operation of the television receiver of the invention shown in FIG. 1.

DESCRIPTION OF THE PREFERRED EMBODIMENT

Figure 3A:
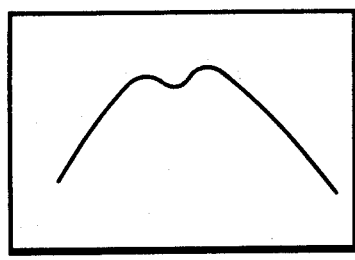
FIGS. 3A to 3H are schematic representations respectively useful for explaining the operation of the television receiver of the invention shown in FIG. 1.

An embodiment of a television receiver according to the present invention will now be described with reference to the attached drawings.

FIG. 1 is a block diagram showing an overall circuit arrangement of one embodiment of the television receiver according to the present invention.

Referring to FIG. 1, the television receiver of this invention includes a main television circuit MK and a sub-television circuit SK. From a video signal supplied by the main television circuit MK, a main picture is displayed on the whole picture screen of a cathode ray tube 18, whereas from a video signal supplied by the sub-television circuit SK, a sub-picture is displayed on one portion of the main picture screen in such a manner that the sub-picture is inset into the main picture. These main and sub-television circuits MK and SK include main and sub-tuners 5M, 5S, main and sub-video intermediate frequency circuits 6M, 6S and main and sub-video/chroma signal circuits 8M, 8S, respectively.

Further, the television receiver of the invention is provided with external video signal input terminals V1, V2 and V3 to which displayed video signals (base band signals) from a VTR (video tape recorder) or the like are supplied. The video signals from these external input terminals V1, V2 and V3 can be selectively switched in place of the video signals from the tuners 5M and 5S by the main and the sub-switching circuits 7M and 7S provided in the television circuits MK and SK. The signal selected by the switching circuit 7M is then supplied to the cathode ray tube 18 to be displayed on its picture screen.

The sub-television circuit SK also includes a video signal processor circuit 12 for displaying the sub-picture on the picture screen of the cathode ray tube 18. The video signal processor circuit 12 controls the kinds of sub-pictures, such as a live picture, a still picture, a step-by-step picture or the like, the number of sub-pictures, the position of the sub-picture on the main picture screen, etc. By "live" picture is meant that the displayed image is animated rather than static.

The main and sub-television circuits MK and SK are respectively provided with main and sub-character display circuits 19M and 19S to display picture discriminating indications such as the reception channel of a television broadcast or the ordinary number of the external video signal input terminals, for example, on the respective main picture screen and the sub-picture screen in an inset fashion.

There is provided a controller 20 which includes a micro-computer. The respective sections of the television receiver are controlled by this system controller 20 as will be explained in greater detail hereinafter.

The circuit arrangement of the television receiver according to this invention will now be described more fully. A television broadcast signal received by an antenna AT is supplied to a distributor 1. The distributor 1 supplies the received signal through a switching circuit 3 to the main tuner 5M without substantially attenuating the same and also supplies a portion of the received signal to the sub-tuner 5S. The received signal to be applied to the sub-tuner 5S is first amplified by a high frequency amplifier 4. The switching circuit 3 selectively switches between the antenna input signal from the distributor 1 and a high frequency input signal from a descrambler used for receiving a cable television broadcast or the like from an auxiliary input terminal 2 and supplies one of them to the main tuner 5M.

The video signal from the main tuner 5M is supplied to the main video intermediate frequency circuit 6M. Then, the video intermediate frequency signal therefrom is supplied to the main switching circuit 7M which can be selectively switched between this video signal and the external video signals from the external video input terminals V1 to V3. The signal selected by the switching circuit 7M is supplied to the main video/chroma signal circuit 8M. A monitor output terminal 26 is connected to the output side of the main switching circuit 7M. This main video/chroma signal circuit 8M generates red, green and blue color signals R, G and B which are then fed to a switching circuit 9.

The audio intermediate frequency signal from the main video intermediate frequency circuit 6M is supplied to an audio circuit (incorporating therein a sound multiplexing decoder circuit) 28. The audio signal from the audio circuit 28 is supplied to a switching circuit 29 which can be selectively switched between this audio signal and the external audio signals displayed from the VTR and the like and supplied thereto from external audio signal input terminals A1, A2 and A3, respectively, corresponding to the above mentioned external video signal input terminals V1, V2 and V3. The audio signal selected by the switching circuit 29 is supplied through a low frequency amplifier 30 to a loudspeaker 31.

The horizontal and vertical synchronizing signals from the main video/chroma signal circuit 8M are supplied to a deflection/high voltage circuit 27. The deflection signal and the high DC voltage from the circuit 27 are supplied to the cathode ray tube 18.

The video signal from the sub-tuner 5S is supplied to the sub-video intermediate frequency circuit 6S. The video intermediate frequency signal therefrom is supplied to the sub-switching circuit 7S which selectively switches between this video signal and the external video signals from the external video signal input terminals V1 to V3. A switch 25 selects between the video signal selected by the switching circuit 7S and the video signal from the main switching circuit 7M and supplies the chosen video signal to the sub-video/chroma signal circuit 8S. From this sub-video/chroma signal circuit 8S, there are derived red, green and blue color signals R, G and B. These red, green and blue color signals R, G and B are supplied to a matrix circuit 10 in which they are converted to a luminance signal Y and red and blue color difference signals R-Y and B-Y, respectively, which are then fed to an A/D (analog-to-digital) converter 13 in the video signal processor circuit 12.

The A/D converter 13 is a time division type A/D converter as disclosed, for example, in Japanese published patent application No. 60-47792. The digital signal from the A/D converter 13 is supplied to a memory 14 and then written therein. The digital signal read out from the memory 14 is supplied to a D/A (digital-to-analog) converter 15 and is thereby converted to an analog signal. In the video signal processor circuit 12, sampling lines and picture elements of the video signal are selected and other lines and picture elements are thrown away or removed in correspondence with the ratio between the sizes of the main picture screen and the sub-picture screen. The memory 14 has frame (or field) memory areas corresponding to the maximum number of displayable sub-pictures, for example, four frame memory areas. This memory 14 is controlled by a sub-picture controller 16 so as to specify the kinds of sub-pictures, such as a live picture, a still picture, a step-by-step picture and so on, the number of sub-pictures, the position of the sub-picture on the main picture and the like.

When the sub-picture is displayed as a live, i.e. a real moving picture, the video signal is alternately written in and read out from the memory 14 continuously and repeatedly; when the sub-picture is displayed as a still picture, the video signal is written in the memory 14 for a selected frame or field period and then read out from the memory 14 repeatedly; and when the sub-picture is displayed as a step-by-step picture, a plurality of video signals are written in the memory 14 at different times corresponding to different frames or field periods and then read out therefrom repeatedly (see Japanese laid-open patent application No. 56-27573). The number of the sub-picture screens inset into the main picture screen is determined on the basis of the number of memory areas in the memory 14 which are used. The contents or pictures of the sub-picture screen can be a real moving picture, a still picture or a step-by-step picture based on the video signal from the sub-video/chroma signal circuit 8S or on the video signal from the main video/chroma signal circuit 8M. The switching of these video signals is carried out by the above mentioned switch 25. The picture contents on the main picture screen and the sub-picture screen can be exchanged with each other by simultaneously switching the reception channels of the main and sub-tuners 5M and 5S or by simultaneously switching the main and sub-switching circuits 7M and 7S.

The respective color signals from the main/video chroma signal circuit 8M and the respective color signals from the D/A converter 15 are supplied to the switching circuit 9 in which both groups of respective color signals are switched at appropriate timing intervals such that the sub-picture screen is inset into one portion of the main picture screen at a selected, predetermined position. This switching circuit 9 is controlled by the sub-picture controller 16, which is controlled by the system controller 20. The video signal from the switching circuit 9 is supplied to the cathode ray tube 18.

The main picture discrimination indicating signal, such as a signal indicative of the main channel number, is formed by the main character display circuit 19M and is added to the video signal by an adder 17 connected between the switching circuit 9 and the cathode ray tube 18. In this example, the adder 17 is interposed only in the transmission path of the green color signal G to thereby superimpose a green picture discrimination indication upon the main picture screen. It is of course possible that this picture discrimination indication can be made by using other colors.

The sub-picture discrimination indicating signal, formed by the sub-character display circuit 19S and which could be indicative of the channel number selected by the sub-tuner 5S, for example, is added to the sub-video signal by an adder 11 connected between the matrix circuit 10 and the A/D converter 13. In this example, an adder 11 is interposed only in the transmission path of the luminance signal Y to thereby superimpose a white picture discrimination indication on the sub-picture screen. Also, it is possible that this picture discrimination indication can be made by using other colors.

The channel selections in the above mentioned main tuner 5M and sub-tuner 5S are carried out by channel selection signals from the system controller 20. The switching circuits 3, 7M, 7S, 29 and the switch 25 are also selectively switched under the control of the system controller 20. The main and sub-video/chroma signal circuits 8M and 8S are subjecte to blanking by the system controller 20 for a short period upon the up and down scanning channel selection operation. Alternatively, this blanking may be carried out by a blanking switch that is provided at the pre-stage of the cathode ray tube 18. Further, main and sub-horizontal synchronizing signals Hm and Hs from the main and sub-video intermediate frequency circuits 6M and 6S and main and sub-vertical blanking signals (vertical signals) Vm and Vs from the main and sub-video/chroma signal circuits 8M and 8S are supplied to the system controller 20. The main picture and sub-picture discrimination indicating signal circuits 19M and 19S and the sub-picture controller 16 are controlled by the system controller 20.

A last-condition memory 21 is provided which stores, under the control of the system controller 20, the selected channels of the main and sub-tuners 5M and 5S, the switch conditions of the switching circuits 7M and 7S, the control conditions of the sub-picture controller 16 and so on when the power of the television receiver is turned off. When the television receiver is powered on again, the conditions of the respective circuits presented when the power of the television receiver was last turned off are displayed under the control of the system controller 20.

A key apparatus 22 is connected to the system controller 20 and is provided with various kinds of keys KY to control the television receiver.

Reference numeral 24 denotes a remote controller (commander) which is also provided with various kinds of keys KY to control the television receiver. This remote controller 24 is also provided with a transmitter (not shown) to transmit a remote control signal based on the corresponding key operation. A receiver 23 for receiving the signal transmitted from the transmitter of the remote controller 24 is connected to the system controller 20. The remote control signal can be transmitted by means of a light beam, radio wave, sound wave and so on.

By way of example, the keys KY of the key apparatus 22 or the remote controller 24 will be enumerated as follows: a power key 33; a recall key 34 (used to display the picture discrimination indication such as the channel number); a mute key (used to mute the sound); ten keys (designated generally by the reference numeral 35) used to select the reception channel and the number of the external video signal input terminal; a TV (television)/VTR change-over key; an antenna input/auxiliary high frequency input change-over key; a sound multiplexing key; up and down keys 36 for incrementing and decrementing the contrast of luminance and chrominance signals, the main reception channels, and the number of the main external video signal input terminal, and the sound volume respectively; an on-off key 37 for the sub-picture screen; up and down keys 38 for incrementing and decrementing the sub-reception channel and the number of the sub-external video signal input terminal; a still picture key 40; a step-by-step picture key; a shift key used to shift the position of the sub-picture screen; and a main-sub exchange key 39 used to exchange the picture contents on the main picture and sub-picture screens.

The still picture reproducing operation of the embodiment of the television receiver according to the present invention will be described with reference to FIG. 2 and FIGS. 3A to 3H.

Referring to the flow chart of FIG. 2, when a still picture reproducing key 40 on the remote controller 24 is depressed at step 1, it is determined by the system controller 20 at step 2 whether or not the sub-picture is displayed by the television receiver.

If the still picture key 40 is depressed when only the main picture is displayed on the picture screen of the cathode ray tube 18 as shown in FIG. 3A, the system controller 20 will cause the switch 25 shown in FIG. 1 to be switched to the state opposite to the state illustrated in FIG. 1 so that the video signal from the main switching circuit 7M is supplied through the sub-video/chroma signal circuit 8S and the matrix circuit 10 to the video signal processor circuit 12. As a result, the video signal presented when the still picture key 40 is depressed is written into the memory 14 for the particular frame period or field period which was coincident with the actuation of the still picture key 40. No further signals are written into the memory 40 until the still picture key 40 is depressed again. As earlier noted, the video signal in this memory 14 is read out repeatedly and thus the main picture presented when the still picture key 40 is depressed is displayed on a sub-picture screen $S_s$, as a still picture as shown in FIG. 3B (at step 3).

While watching the real moving picture displayed on this main picture screen $S_m$, the viewer can again depress the still picture key 40 at a selected time point to capture in the memory 14 a new still picture from the moving main picture. In the manner heretofore described, the new still picture captured from the main picture is displayed on the sub-picture screen $S_s$ as a new still picture while the main picture is continuously displayed on the main picture screen $S_m$ as a real moving picture as shown in FIG. 3C. In a like manner, each time the still picture key 40 is depressed, the still picture on the sub-picture screen $S_s$ is renewed as shown in FIG. 3D.

Figure 3E:
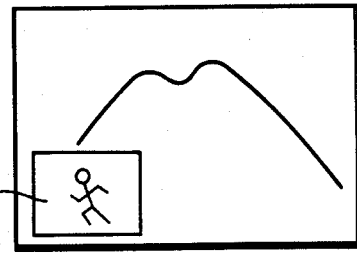
Figure 3B:
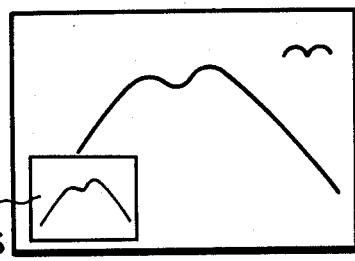

When the switch 25 in FIG. 1 is connected in the illustrated state so that the video signal from the sub-switching circuit 7S is supplied to the video signal processor circuit 12, the main picture is displayed on the main picture screen $S_m$ and simultaneously a sub-picture based on a video signal from a signal source different from that of the main picture is displayed on the sub-picture screen $S_s$, as shown in FIG. 3E. If the still picture key 40 is depressed (at step 1), it is determined by the system controller 20 at step 2 whether or not the sub-picture is being displayed. Further, the system controller 20 determines at step 4 whether the sub-picture being displayed is a real moving picture or not.

Figure 3F:
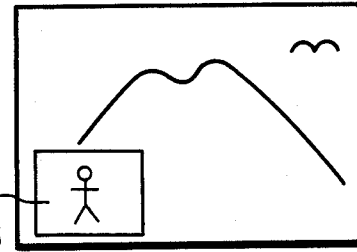
Figure 3C:
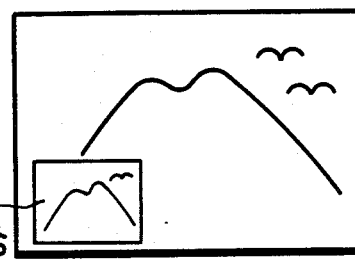

When the sub-picture is displayed as a real moving picture, the system controller 20, at step 5, causes the video signal supplied from the sub-switching circuit 7S when the still picture key 40 is depressed to be written in the memory 14 for a particular frame period or field period which is coincident with the activation of the still picture key 40, as described above. The writing into the memory 14 is then stopped. The system controller 20 causes the video signal presented when this still picture key 40 is depressed to be repeatedly read out of the memory 14 and displayed on the sub-picture screen $S_s$ as a still picture as shown in FIG. 3F.

Figure 3G:
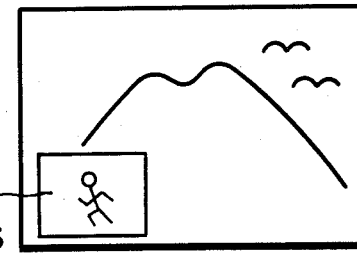
Figure 3D:
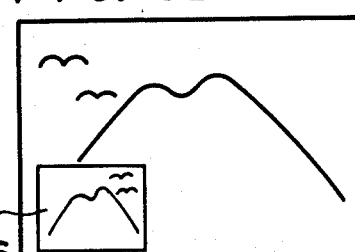

If, however, the still picture key 40 is depressed when the sub-picture is a still picture (step 6), the writing of the video signal in the memory 14 is started again and also this video signal is sequentially read out from the memory 14 and displayed on the sub-picture screen $S_s$ as a real moving picture as shown in FIG. 3G.

Figure 3H:
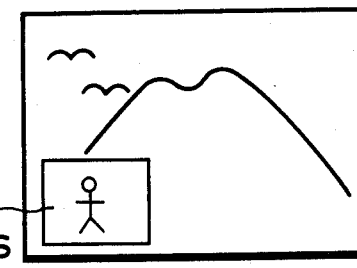

When the user depresses the still picture key 40 while watching a real moving picture on the sub-picture screen $S_s$, a still picture from the moving sub-picture is captured in the memory 14 at the instant when the still picture key 40 is depressed and is displayed on the sub-picture screen $S_s$ as shown in FIG. 3H (similar to step 5).

According to this embodiment of the present invention as described above, when the still picture key 40 is depressed while the sub-picture is being displayed, if the sub-picture is a still picture, it is changed to a real moving picture, while if the sub-picture is a real moving picture it is changed to a still picture. Accordingly, when the still picture key 40 is repeatedly depressed the display on the sub-picture screen of the still picture and the display of a real moving picture are alternately and repeatedly carried out at every operation of the still picture key 40 so that the pictures displayed on the sub-picture screen $S_s$ can be positively distinguished from a still picture taken from the main picture screen and displayed on the sub-picture screen.

The main picture is continuously displayed as a real moving picture regardless of the fact that the sub-picture is changed to a still picture and a real moving picture and vice versa.

According to the present invention as set forth above in detail, the main picture or the sub-picture can be displayed as a still picture on the sub-picture screen by simply depressing the still picture key 40 when the main picture is displayed or when the main picture and the sub-picture are displayed simultaneously, respectively. Thus, it becomes possible to obtain a television receiver of the picture-in-picture type which does not cause the user to be confused when using the still picture feature.

The above description is given on a single preferred embodiment of the invention but it will be apparent that many modifications and variations could be effected by one skilled in the art without departing from the spirits or scope of the novel concepts of the invention so that the scope of the invention should be determined by the appended claim only.

We claim as our invention:

1. A method of operating a television receiver of the type in which a sub-picture is displayed on a sub-picture screen inset within a main picture screen on which a main picture is displayed comprising the steps of:
   selectively displaying on the sub-picture screen either a succession of still pictures taken from the main picture or alternately a still picture and a real moving picture taken from said sub-picture.

2. A television receiver comprising:
   (a) a cathode ray tube having a picture screen which is divisible into a main picture screen and one or more sub-picture screens inset into the main picture screen;
   (b) a main picture circuit for selecting a first video signal from a plurality of video signals and supplying it as the video signal for the main picture screen;
   (c) a sub-picture circuit for selecting a second video signal from a plurality of video signals and supplying one of the selected first and second video signals as a sub-picture video signal for said sub-picture screen, said sub-picture circuit including memory means for storing one or more frames of the one video signal and repeatedly reading out one or more stored frames as the sub-picture video signal;
   (d) a composing circuit for composing the selected first video signal for a main picture screen of said cathode ray tube and the selected one video signal for a sub-picture screen which is inset into a part of said main picture screen into a composite signal which is supplied to the cathode ray tube;
   (e) system controller means, including viewer controllable still picture means, connected to the main picture circuit and the sub-picture circuit for controlling their operations to cause the one video signal and the frame or frames from said one video signal to be stored in the memory means and then repeatedly read out of the memory means to be reproduced on the sub-picture screen as a moving picture or a still picture, depending upon whether a single frame is repeatedly read out of the memory means or a continuous series of frames are read out of the memory means, and wherein when the stored frame is taken by the sub-picture circuit from the first video signal of said main picture, a new still picture is displayed each time said still picture control means is operated, whereas when the still picture is taken by the sub-picture circuit from the second video signal of said sub-picture, the display of the still picture and the display of a real moving picture are alternately carried out each time said still picture control means is operated.

* * * * *